US010551899B2

(12) United States Patent
Yamamoto

(10) Patent No.: US 10,551,899 B2
(45) Date of Patent: Feb. 4, 2020

(54) ELECTRONIC DEVICE, CONTROL METHOD OF ELECTRONIC DEVICE, AND PROGRAM

(71) Applicant: Sony Corporation, Tokyo (JP)

(72) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/185,414

(22) Filed: Nov. 9, 2018

(65) Prior Publication Data
US 2019/0079572 A1 Mar. 14, 2019

Related U.S. Application Data

(63) Continuation of application No. 15/481,178, filed on Apr. 6, 2017, now abandoned, which is a continuation
(Continued)

(30) Foreign Application Priority Data

Jun. 17, 2011 (JP) .................................. 2011-135462

(51) Int. Cl.
*G06F 1/32* (2019.01)
*G06F 1/3234* (2019.01)
(Continued)

(52) U.S. Cl.
CPC ............ *G06F 1/3234* (2013.01); *G01P 15/14* (2013.01); *G06F 1/3231* (2013.01);
(Continued)

(58) Field of Classification Search
CPC .... G06F 1/3231; G06F 1/3234; G06F 1/3262; G06F 3/044; G01P 15/14
See application file for complete search history.

(56) References Cited

U.S. PATENT DOCUMENTS 5,954,819 A * 9/1999 Kenny .................. G06F 1/3203
713/322
7,188,263 B1 3/2007 Rubinstein et al.
(Continued)

FOREIGN PATENT DOCUMENTS

JP 2008-242705 A 10/2008
JP 2009-008411 A 1/2009
(Continued)

*Primary Examiner* — Mark A Connolly
(74) *Attorney, Agent, or Firm* — Xsensus LLP

(57) ABSTRACT

Aspects of the present invention include a device including processing circuitry that detects a first user action according to a first signal received from a first sensor while operating in a first mode, the first user action being gripping and lifting up of the device, changes an operation mode from the first mode to a second mode based on the first user action, detects a second user action according to a second signal received from a second sensor while operating the second mode, the second user action being a touch operation, performs an operation based on the second user action, and changes the operation mode from the second mode to a third mode after a predetermined period of time elapses, the second mode consuming more power than the first mode, and the third mode consuming more power than the first mode.

17 Claims, 8 Drawing Sheets

Related U.S. Application Data of application No. 15/258,511, filed on Sep. 7, 2016, now Pat. No. 9,933,837, which is a continuation of application No. 14/125,140, filed as application No. PCT/JP2012/003220 on May 17, 2012, now Pat. No. 9,459,686.

(51) Int. Cl.

| | | |
|---|---|---|
| *G08C 17/02* | (2006.01) | |
| *H04N 21/422* | (2011.01) | |
| *H04N 21/443* | (2011.01) | |
| *G01P 15/14* | (2013.01) | |
| *G06F 1/3231* | (2019.01) | |
| *G06F 3/044* | (2006.01) | |
| *G06F 3/045* | (2006.01) | |

(52) U.S. Cl.
CPC ............ *G06F 1/3262* (2013.01); *G06F 3/044* (2013.01); *G06F 3/045* (2013.01); *G08C 17/02* (2013.01); *H04N 21/42202* (2013.01); *H04N 21/4436* (2013.01); *G08C 2201/12* (2013.01); *G08C 2201/32* (2013.01)

(56) References Cited

U.S. PATENT DOCUMENTS

| | | | |
|---|---|---|---|
| 8,230,246 | B1 | 7/2012 | Sharkey |
| 8,261,090 | B1 | 9/2012 | Matsuoka |
| 8,390,578 | B2 | 3/2013 | Chino |
| 8,866,791 | B2 | 10/2014 | Barnhoefer et al. |
| 9,054,680 | B2 | 6/2015 | Kim et al. |
| 9,113,190 | B2 | 8/2015 | Clavin et al. |
| 2006/0179944 | A1 | 8/2006 | Lau |
| 2009/0140863 | A1 | 6/2009 | Liu et al. |
| 2010/0013778 | A1 | 1/2010 | Liu et al. |
| 2011/0018817 | A1 | 1/2011 | Kryze et al. |
| 2011/0080349 | A1 | 4/2011 | Holbein et al. |
| 2011/0090161 | A1 | 4/2011 | Tsuzaki et al. |
| 2011/0167391 | A1 | 7/2011 | Momeyer et al. |

FOREIGN PATENT DOCUMENTS

| | | |
|---|---|---|
| JP | 2009-193483 A | 8/2009 |
| JP | 2011-013735 A | 1/2011 |
| JP | 2011-086179 A | 4/2011 |

\* cited by examiner

[Fig. 1]
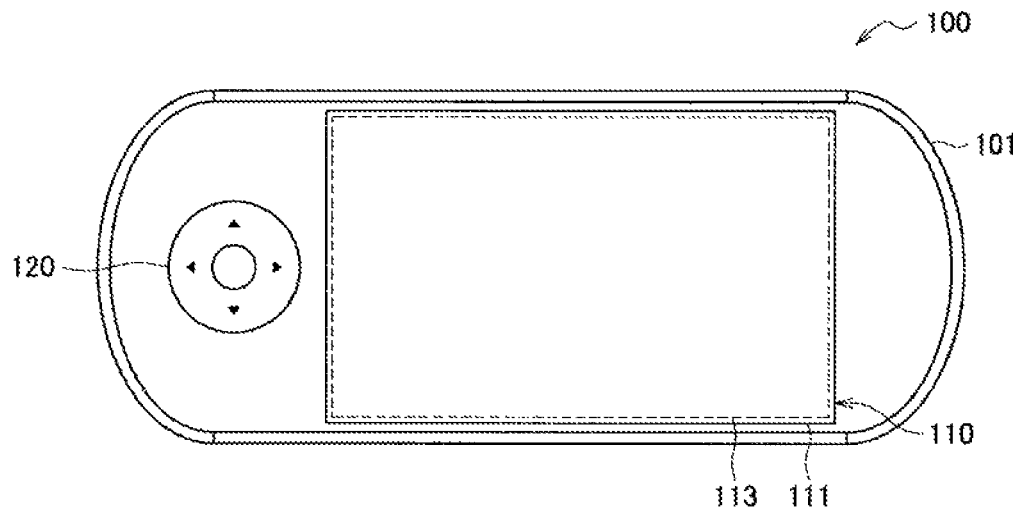
[Fig. 2]
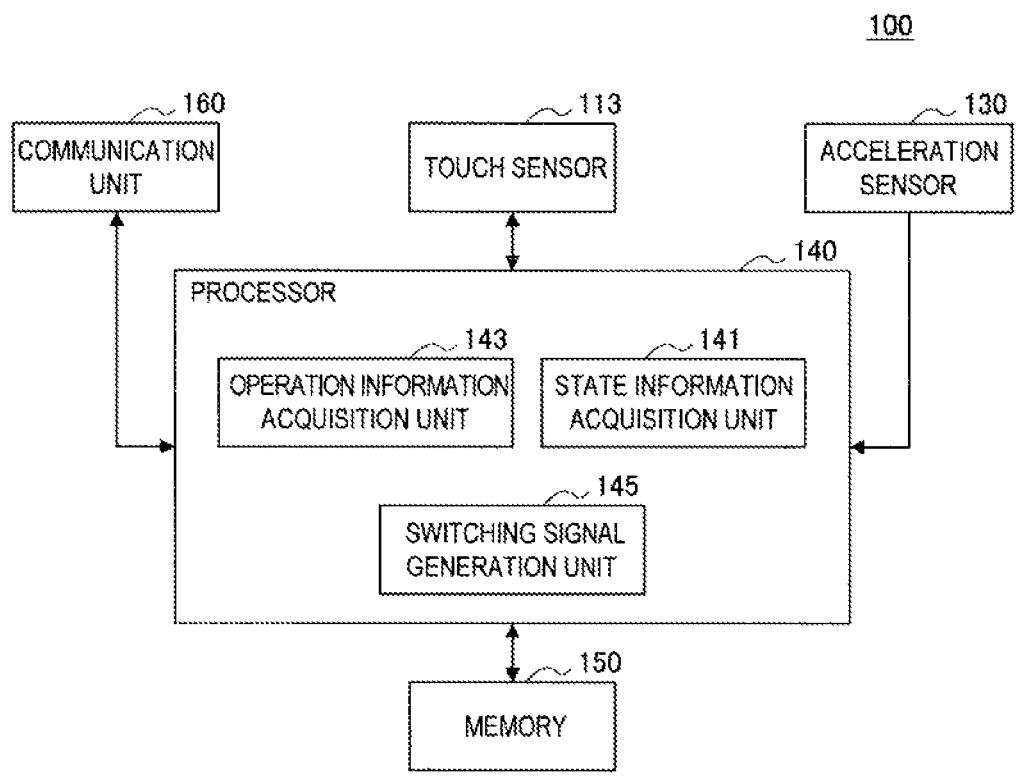

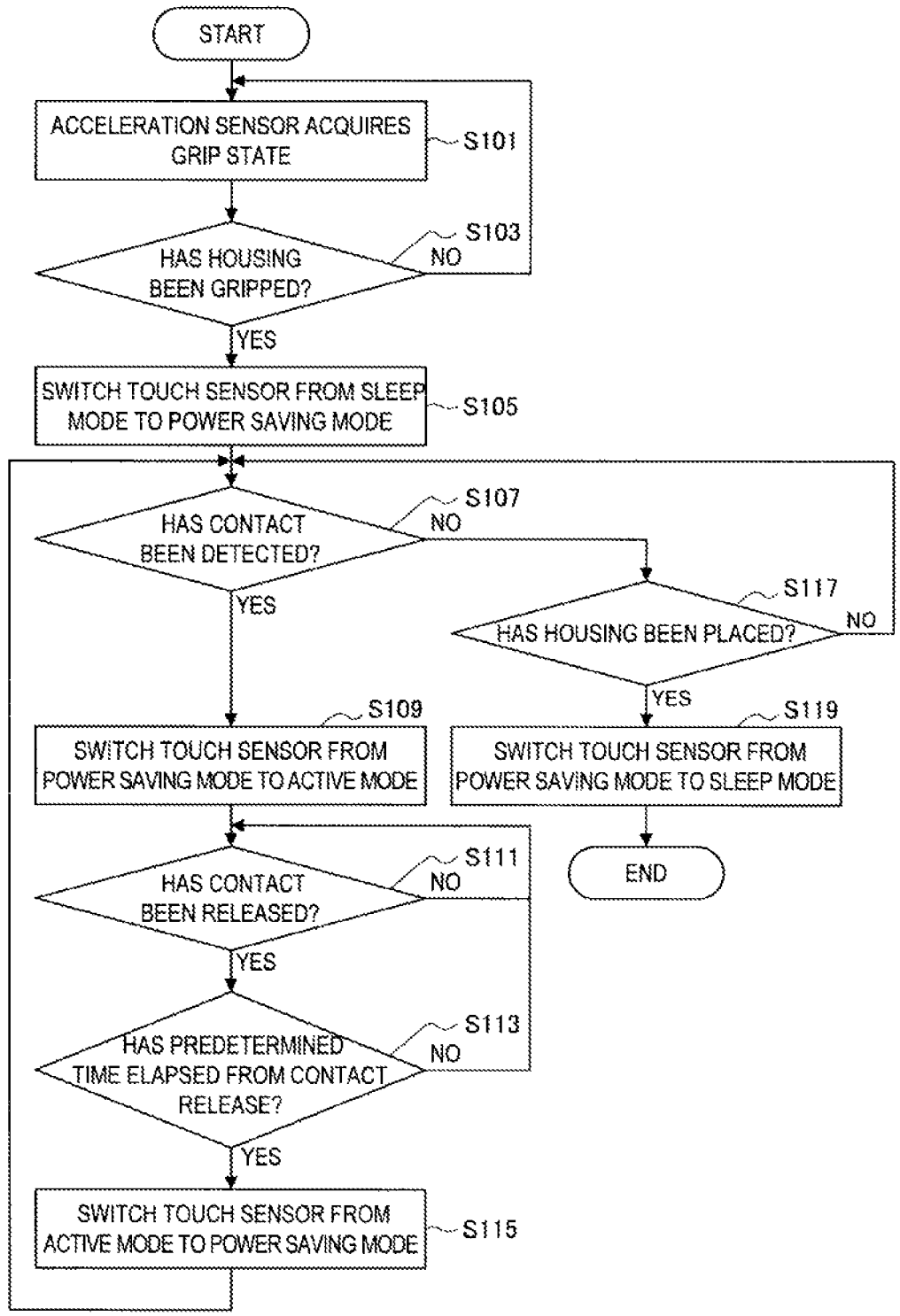
[Fig. 3]

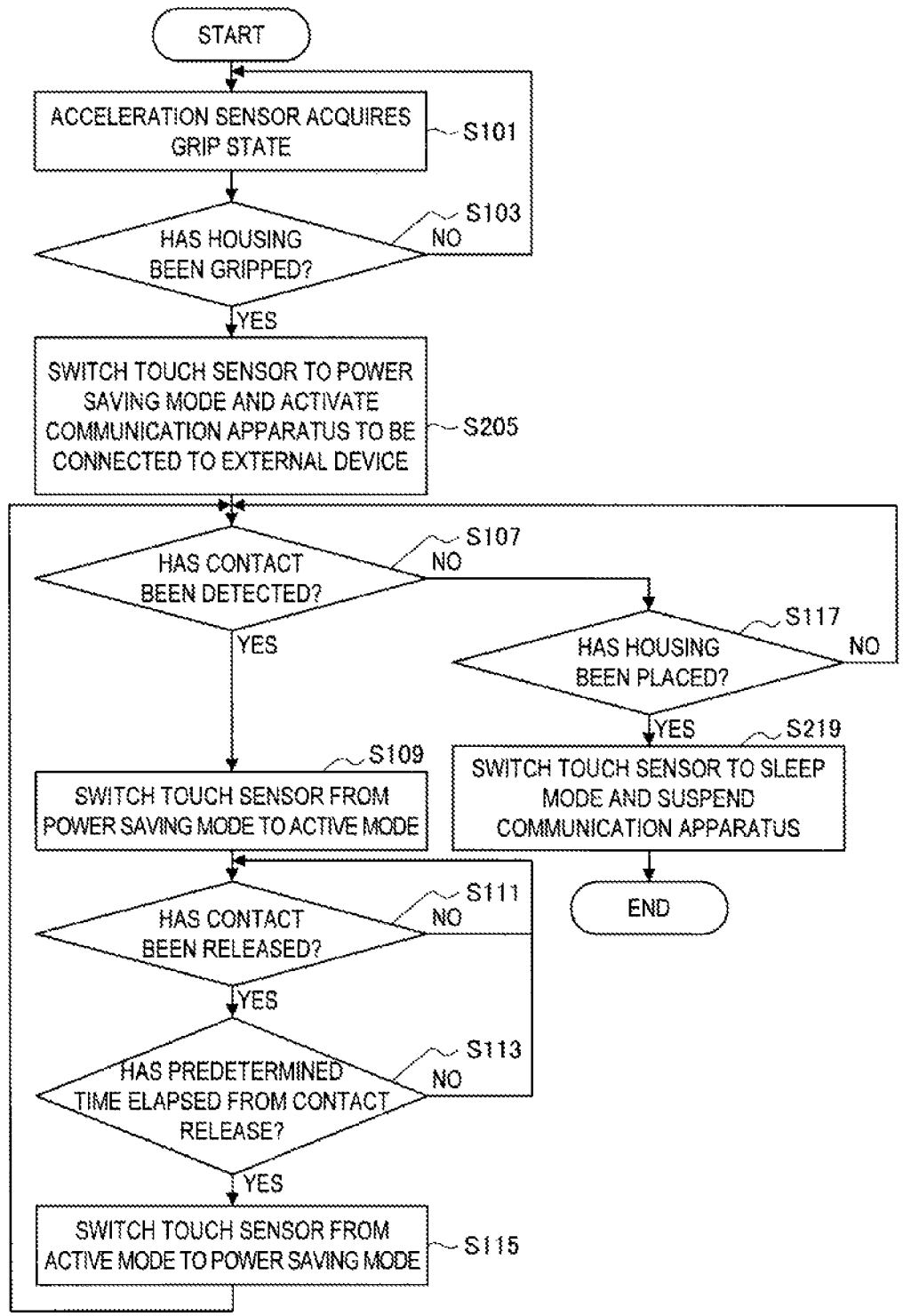
[Fig. 4]

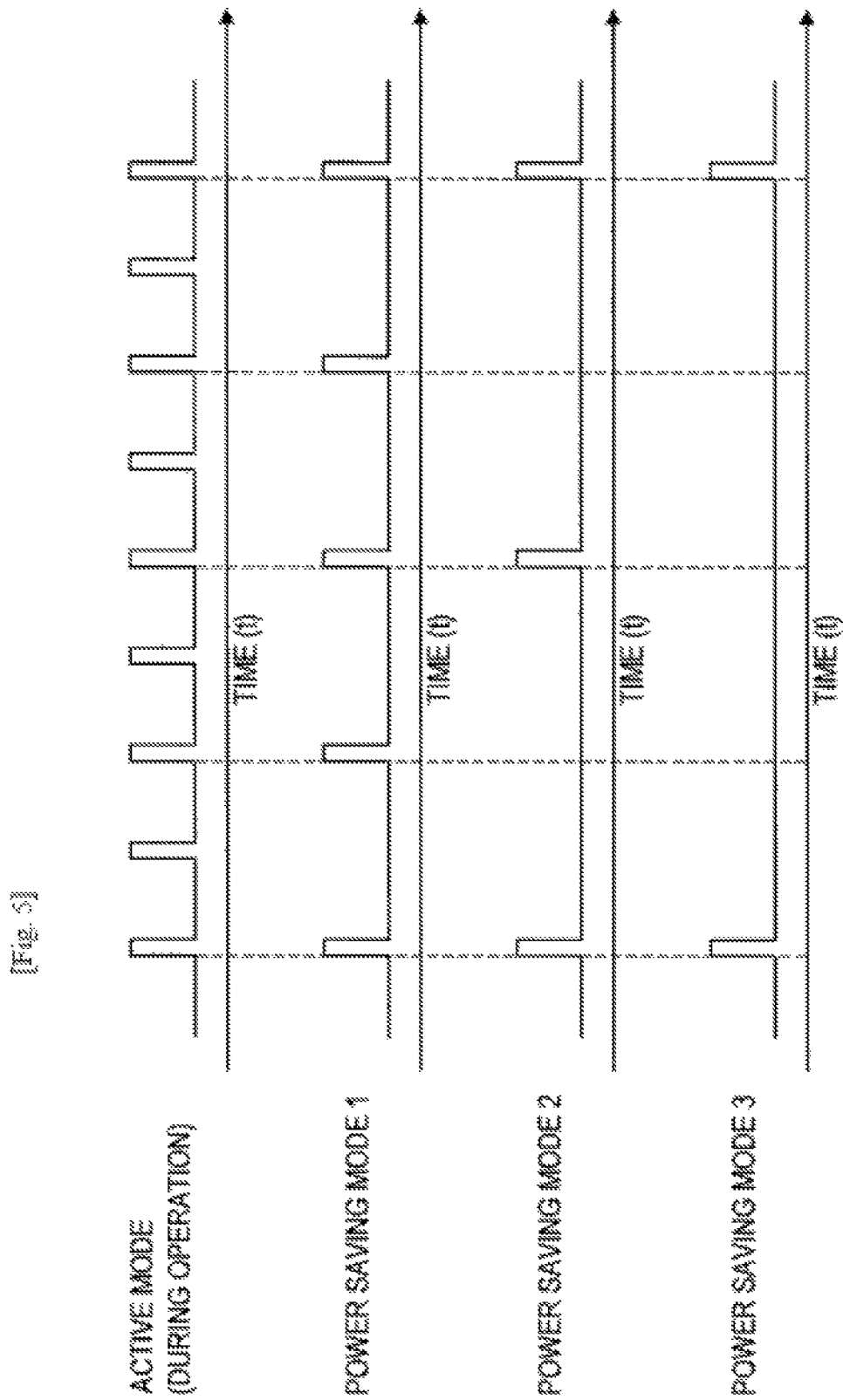

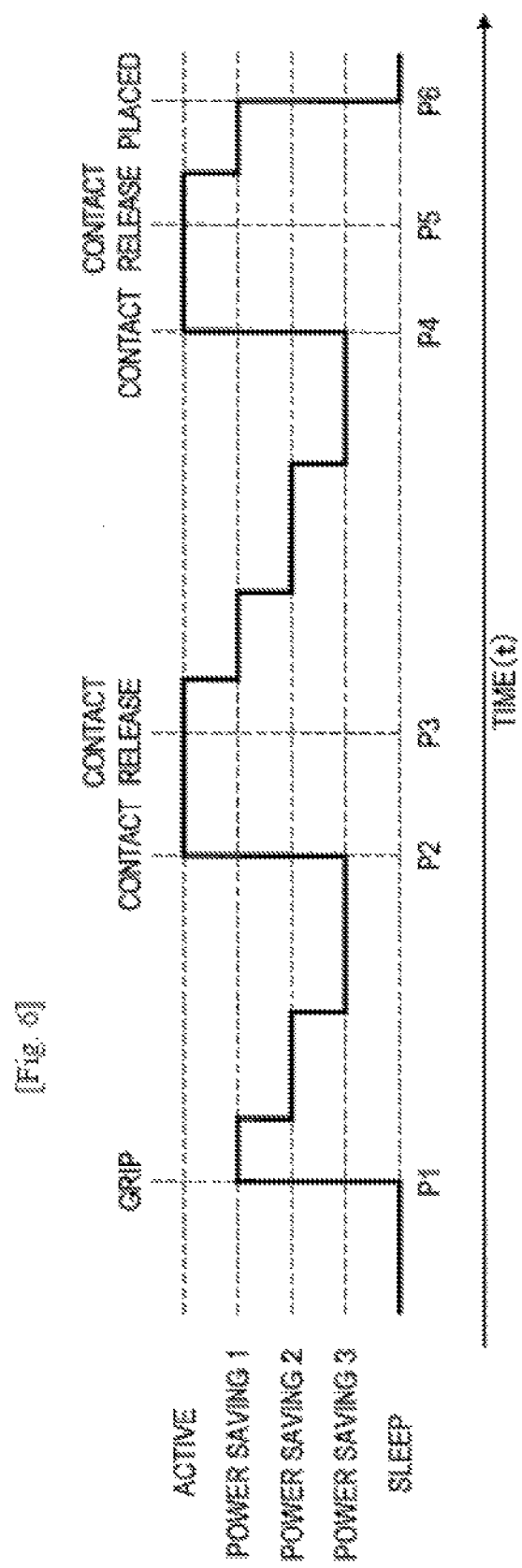

[Fig. 7]
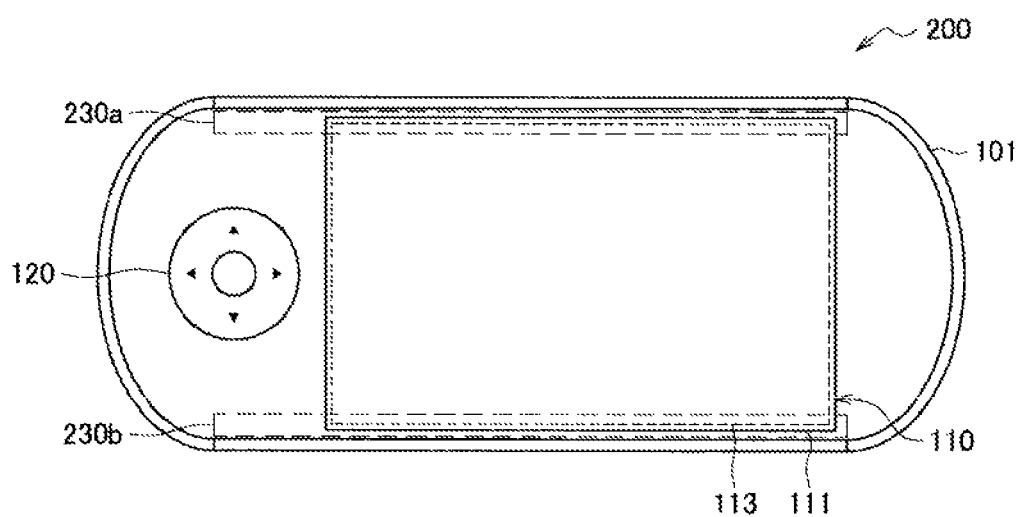

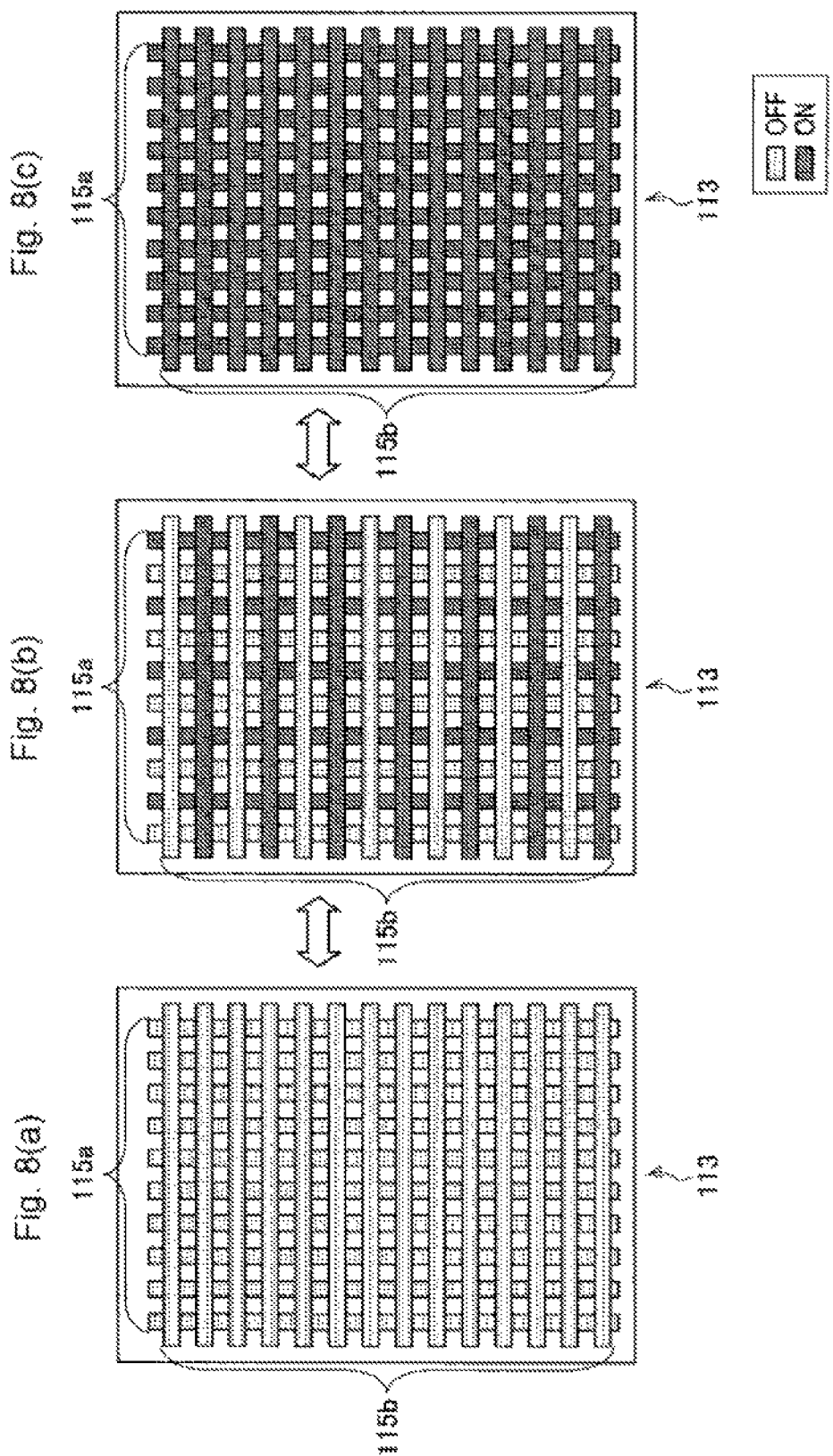

[Fig. 9]
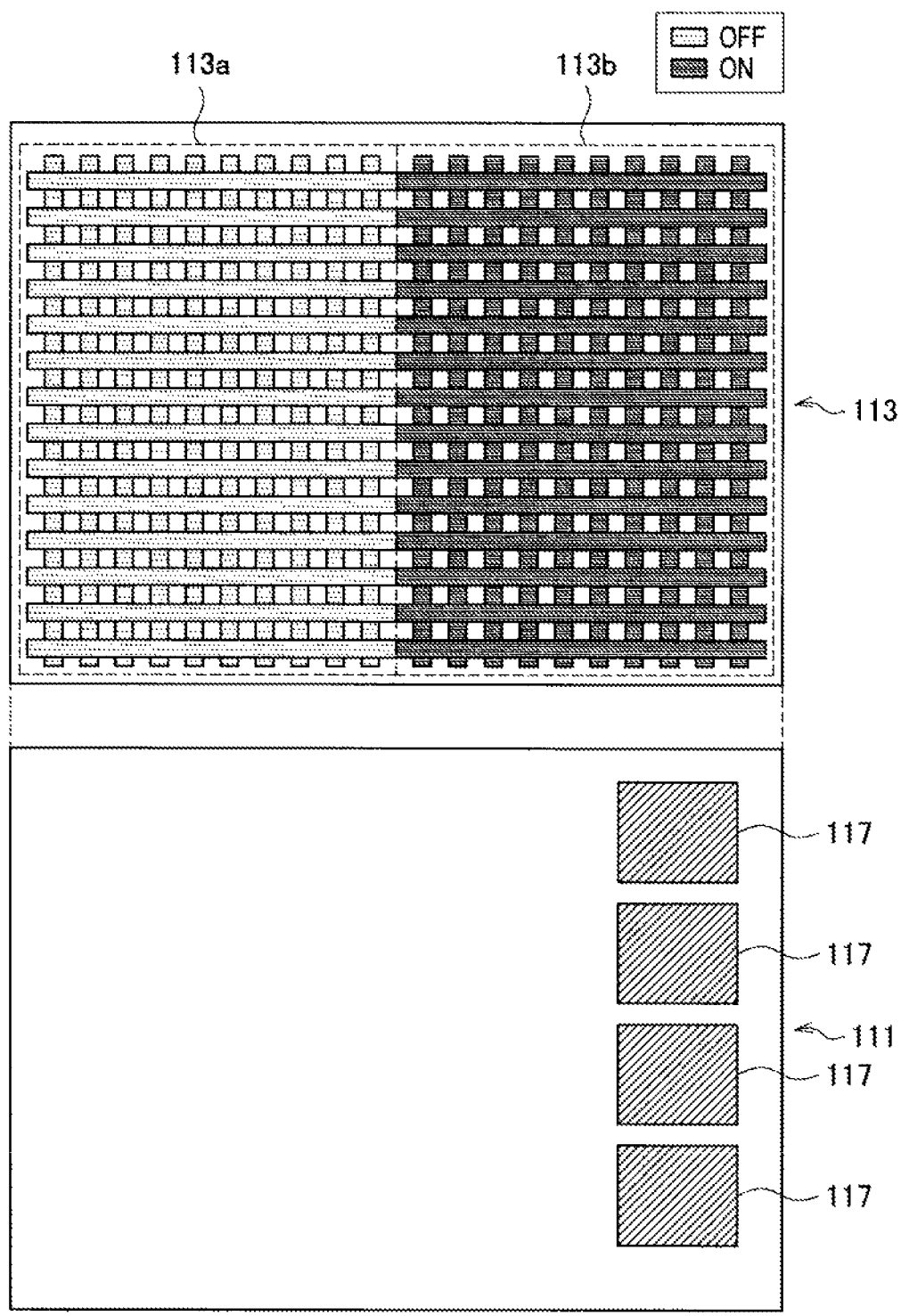

ELECTRONIC DEVICE, CONTROL METHOD OF ELECTRONIC DEVICE, AND PROGRAM

CROSS-REFERENCE TO RELATED-APPLICATION

The present application is a continuation application of U.S. patent application Ser. No. 15/481,178, filed Apr. 6, 2017, which is a continuation of U.S. patent application Ser. No. 15/258,511, filed Sep. 7, 2016 (now U.S. Pat. No. 9,993,837, issued on Apr. 3, 2018), which is a continuation of U.S. patent application Ser. No. 14/125,140, filed Dec. 10, 2013 (now U.S. Pat. No. 9,459,686, issued on Oct. 4, 2016), which is a National Stage of PCT/JP2012/003220, filed May 17, 2012, and claims the benefit of priority from prior Japanese Patent Application JP 2011-135462, filed Jun. 17, 2011, the entire content of which is hereby incorporated by reference.

TECHNICAL FIELD

The present disclosure relates to, among other things, an electronic device, a control method of the electronic device, and a program.

BACKGROUND ART

An electronic device may use, for example, a button or a keyboard as an apparatus for acquiring a user's operation input. Recently, a method for acquiring a user's operation using various types of sensors has been developed. For example, International Publication No. 2009-008411 discloses technology for acquiring a user's three dimensional motion as a user's operation input using an acceleration sensor and a gyro sensor.

When the electronic device acquires the user's operation using such a sensor, power consumption is large as compared with the case of using a button, a keyboard and the like. This is because a sensor such as a gyro sensor consumes a large amount of power as compared with the button or the keyboard. Therefore, International Publication No. 2009-008411 has disclosed technology for further reducing power consumption by restricting the supply of power to the gyro sensor with high power consumption when there is no input from the acceleration sensor.

SUMMARY

Technical Problem

However, in recent years, since the type and purpose of a sensor used for the operation input of an electronic device have been diversified, a reduction effect of power consumption may not be sufficiently achieved by the technology disclosed in International Publication No. 2009-008411.

According to the present disclosure, there are provided a novel and modified electronic device, a control method of the electronic device, and a program, capable of further reducing the consumption of power for acquiring an operation.

Solution to Problem

Aspects of the present invention include a device comprising a memory storing instructions and a processing circuit executing the instructions to detect a first user action. The instructions also may include instructions to establish a first user action state based on the detected first user action, designate a first mode based on the first user action state, determine if a second user action, consistent with a first detection condition associated with the first mode, has taken place, when the second user action has taken place, establish a second user action state based on the second user action, and designate a second mode based on the second user action state, the second mode consuming more power than the first mode.

Aspects of the present invention include a method comprising detecting a first user action. The method also may include establishing a first user action state based on the detected first user action, designating a first mode based on the first user action state, determining if a second user action, consistent with a first detection condition associated with the first mode, has taken place, when the second user action has taken place, establishing a second user action state based on the second user action, and designating a second mode based on the second user action state, the second mode consuming more power than the first mode.

Aspects of the present invention include a tangibly embodied non-transitory computer-readable medium storing instructions which, when executed by a processor, perform a method comprising detecting a first user action. The method may also include establishing a first user action state based on the detected first user action, designating a first mode based on the first user action state, determining if a second user action, consistent with a first detection condition associated with the first mode, has taken place, when the second user action has taken place, establishing a second user action state based on the second user action, and designating a second mode based on the second user action state, the second mode consuming more power than the first mode.

Advantageous Effects of Invention

According to the present disclosure as described above, it is possible to reduce the consumption of power for acquiring an operation in an electronic device.

BRIEF DESCRIPTION OF DRAWINGS

FIG. 1 is a diagram illustrating an external appearance of an electronic device according to a first embodiment of the present disclosure;

FIG. 2 is a block diagram illustrating a functional configuration of the electronic device according to the first embodiment of the present disclosure;

FIG. 3 is a flowchart illustrating a process of the first embodiment of the present disclosure;

FIG. 4 is a flowchart illustrating a process of a modification of the first embodiment of the present disclosure;

FIG. 5 is a diagram for explaining sub-modes of a power saving mode set in a touch sensor in a second embodiment of the present disclosure;

FIG. 6 is a diagram for explaining an example of a detection mode set in the touch sensor in the second embodiment of the present disclosure;

FIG. 7 is a diagram illustrating an electronic device according to a third embodiment of the present disclosure;

FIGS. 8(a), 8(b) and 8(c) illustrate diagrams for explaining a detection mode set in a touch sensor in a fourth embodiment of the present disclosure; and FIG. 9 is a diagram for explaining a modification of the fourth embodiment of the present disclosure.

DESCRIPTION OF EMBODIMENTS

Hereinafter, embodiments of the present disclosure will be described in detail with reference to the appended drawings. Note that, in this specification and drawings, structural elements that have substantially the same function and structure are denoted with the same reference numerals, and repeated explanation of these structural elements is omitted.

Furthermore, the following description will be given in the following order.
1. First embodiment (example in which sampling rate is changed in power saving mode)
  1-1. Apparatus configuration
  1-2. Process flow
2. Second embodiment (example in which sub-modes are set in power saving mode)
3. Third embodiment (example in which electric field sensor is used) [0029]
4. Fourth embodiment (example in which the number of detection points is changed in power saving mode)
5. Modifications
6. Supplement 1. First Embodiment 1-1. Apparatus Configuration FIG. 1 is a diagram illustrating the external appearance of a remote controller 100 (or processing circuit) which is an electronic device according to a first embodiment of the present disclosure. The remote controller 100, for example, is a device for transmitting information on a user's operation input to an external device such as a television or a recorder, and is gripped and used by a user. Although the device 100 is referred to as a "remote controller," it is to be understood that it is not necessary for device 100 to control another device remotely. Rather, remote controller 100 may control another device remotely and may also or alternatively perform other functions (e.g., communicating with other devices, providing an interactive display to the user, etc.).

The remote controller 100 is provided with a housing 101 gripped by a user. The illustrated housing 101 has an oval plate shape. However, the shape of the housing 101 is not limited thereto. For example, the housing 101 may have any suitable shape for gripping by a user. A touch panel 110 may be provided on the surface of the housing 101, and/or on another part of the controller 100, and a button 120, and is provided therein with circuit parts for realizing a functional configuration which will be described later.

The touch panel 110 may include a display 111 and a touch sensor 113. The display 111 may display an image such as a GUI (Graphical User Interface) for operating the remote controller 100. A touch sensor 113 detects a user's contact to a specific part of the display 111. Information on the user's contact detected by the touch sensor 113 may be acquired as an operation input and is transmitted from the remote controller 100 to an external device to be operated.

The button 120 may acquire pressure by a user as an operation input. In the following description, an operation input using the touch panel 110 will be mainly described. However, the remote controller 100 may also have other operation input devices such as the button 120. Since well-known technology is used for operation input using other operation input devices, detailed description thereof will be omitted.

So far, the external appearance of the remote controller 100 has been described. As described above, the remote controller 100 may use the touch sensor 113 in order to acquire an operation input. The touch sensor 113 is a sensor with high power consumption as compared with a sensor such as an acceleration sensor. Since the remote controller 100 is driven by a dry cell in many cases, management of the power consumption of the touch sensor 113 is an important factor in the improvement of usability through the extension of battery lifespan.

FIG. 2 is a block diagram illustrating the functional configuration of the remote controller 100 which is the electronic device according to the first embodiment of the present disclosure. The remote controller 100 which is the electronic device includes an acceleration sensor 130, the touch sensor 113, a processor 140, a memory 150, and a communication unit 160 as the functional configuration.

The acceleration sensor 130 includes an acceleration sensor such as a piezo resistance-type sensor, a piezoelectric-type sensor, or a capacitance-type sensor. The acceleration sensor 130 may include a triaxial acceleration sensor for detecting acceleration along three axes perpendicular to one another, a biaxial acceleration sensor for detecting acceleration along two axes perpendicular to one another, or a uniaxial acceleration sensor. In the present embodiment, the acceleration sensor 130 detects the grip state of the housing 101 by a user according to a change in acceleration. Here, the acceleration sensor 130 is an example of a first detection unit which generates state information, which may indicate that the housing 101 provided with the touch panel 110 (an operation unit) has been gripped, according to the detection of the grip state. As long as the detection is possible, a sensor type or the number of axes is not important. In addition, the acceleration sensor 130 may be used for the detection of the grip of the housing 101. The acceleration sensor 130 may also have other purposes, for example, may have the purpose of detecting the slope of the remote controller 100. The acceleration sensor 130 may have a plurality of power saving modes, and may also be used in a power saving mode.

The processor 140 (or, alternatively, the "controller" or "processing circuit") may operate according to a program stored in the memory 150, and controls each element of the remote controller 100. The processor 140 performs functions of a state information acquisition unit 141, an operation information acquisition unit 143, and a switching signal generation unit 145. The state information acquisition unit 141 acquires state information which is generated according to the detection of the acceleration sensor 130. The operation information acquisition unit 143 acquires operation information based on a contact, which is generated according to the detection of the touch sensor 113 and performed with respect to the touch panel 110. The switching signal generation unit 145 generates a switching signal for driving the touch sensor 113 by switching the mode of the touch sensor 113 according to the state information and the operation information. In addition, the processes of the state information acquisition unit 141, the operation information acquisition unit 143, and the switching signal generation unit 145 will be described in detail below.

The memory 150 may store data used in the remote controller 100. The memory 150, for example, stores a program for operating the processor 140. Information stored in the memory 150 may also include information on a plurality of detection modes set in the touch sensor 113 by the switching signal generation unit 145 as will be described later.

The communication unit 160 acquires the operation information generated according to the detection of the touch sensor 113 from the processor 140, and may be realized as a communication apparatus for transmitting the information to an external apparatus as an operation input. The communication unit 160, for example, may communicate with the external apparatus using infrared rays, or may also communicate with the external apparatus through radio communication using RF4CE (Radio Frequency for Consumer Electronics) standard or Bluetooth (a registered trademark).

The touch sensor 113 is a touch sensor such as a capacitance-type touch sensor or a resistive film-type touch sensor. The touch sensor 113 may scan an area of the touch panel 110 at a sampling rate and may detect a user's contact. Here, the touch sensor 113 is an example of a second detection unit which generates operation information based on a contact operation (first operation), which is performed with respect to the touch panel (the operation unit), according to the detection of the contact operation. The power consumption of the touch sensor 113 is may be high as compared with the acceleration sensor 130. However, it is possible to suppress the power consumption by changing the sampling rate or a number of detection points (e.g., locations where the touch sensor 113 is sensitive to and may detect a touch). The touch sensor 113 provides the processor 140 with information on the user's contact, and the processor 140 provides the communication unit 160 with the information.

Hereinafter, a detection mode of the touch sensor 113 will be described. In the present embodiment, as will be described later, the detection mode of the touch sensor 113 is switched between first to third detection modes by the function of the switching signal generation unit 145.

The first detection mode is a sleep mode in which the sampling rate of the touch sensor 113 is set to a minimum value. The sampling rate may also be set to zero. In this mode, the power consumption of the touch sensor 113 is minimal among the three modes. In addition, the power consumption of the acceleration sensor 130 is lower than the power consumption of the touch sensor 113 driven in the sleep mode. Meanwhile, since the detection accuracy of the touch sensor 113 is the lowest, no user's contact is actually detected. The sleep mode may also be an OFF mode in which no power is supplied to the touch sensor, or a standby mode in which power is slightly supplied for quick transition to other modes, and the like.

The second detection mode is a power saving mode in which the sampling rate of the touch sensor 113 is set to a value smaller than a normal value. In this mode, the power consumption of the touch sensor 113 is relatively low. Meanwhile, the detection accuracy of the touch sensor 113 is relatively low, and a user's contact itself is detected but may not be correctly detected according to the type of contact operation. The detection accuracy of the detection condition of the power saving mode is higher than that of the detection condition of the sleep mode. The phrase "detection condition," as used herein, may refer to any number of conditions, protocols and methods for detecting a user action. A user action may refer to any action performed by a user that may be detected by remote controller 100, a portion of remote controller 100, a device in communication with remote controller 100 or any other device described herein. Examples of user actions include grasp motions, touch or contact motions and/or pointing, drag operations, point operations, tap operations, flick operations, swipe operations, clicking, depressing of buttons, or other such user actions discussed herein or known in the art. "Detection conditions" include, but are not limited to, detecting the user action within a specified time frame or time period, frequencies of detection or sampling of user actions, density or number of sensors and/or detection points, etc. "Detection mode," as used herein, may be synonymous with "detection condition." in addition, a "detection mode" may employ one or more "detection conditions." This is an example in which, in the second detection mode, the second detection unit is driven in the second detection condition with a weak restriction as compared with the first detection condition of the first detection mode.

The third detection mode is an active mode in which the sampling rate of the touch sensor 113 is set to the normal value. In this mode, since the power consumption of the touch sensor 113 is relatively high, long time continuity of this mode reduces the battery lifespan. When the detection accuracy of the touch sensor 113 is high, it may be possible to correctly detect various types of contact operations. The detection accuracy of the detection condition of the active mode may be higher than that of the detection condition of the power saving mode. This is an example in which, in the third detection mode, the second detection unit is driven in the third detection condition with a weak restriction as compared with the second detection condition of the second detection mode. As described above, in the present embodiment, the "detection condition with a weaker restriction" may correspond to a "detection condition with higher accuracy."

Here, the value of the sampling rate for determining the detection accuracy in the power saving mode, which is the second detection mode, may also be changed according to, for example, a type of an application executed in an external device which receives information on a contact to the touch panel 110 from the remote controller 100. The application may use the contact information as an operation input.

For example, when an application using an operation such as a tap operation or a flick operation with a relatively short continuous contact time on the touch panel 110 is executed in an external device, the switching signal generation unit 145 may set a relatively high sampling rate, at which such an operation is detectable, as the sampling rate of the power saving mode. Furthermore, for example, when an application using an operation such as a drag operation or a pointing operation with a relatively long continuous contact time on the touch panel 110 is executed in the external device, the switching signal generation unit 145 may set a relatively low sampling rate as the sampling rate of the power saving mode.

In addition, information on the application executed in the external device, for example, can be acquired by allowing the communication unit 160 to perform bidirectional communication including transmission to the external device and reception from the external device, and receiving information on an application transmitted from the external device, using the communication unit 160.

So far, the functional configuration of the remote controller 100 has been described. In addition, the remote controller 100 may further have a functional configuration such as a functional configuration for displaying a GUI on the display 111 or a functional configuration for operation input using the button 120 (not illustrated). For the above functional configuration, since it is possible to use well-known technology, detailed description thereof will be omitted.

1-2. Process Flow

FIG. 3 is a flowchart illustrating the process of the remote controller 100 which is the electronic device according to the first embodiment of the present disclosure. For example, when a user picks up the remote controller 100 placed on a table and the like, performs operation input by making contact with the touch panel, and places the remote controller on the table again, the following processes of steps S101, S103, S105, S107, S109, S111, S113, S115, S117, and S119 are performed in the remote controller 100.

First, the acceleration sensor 130 acquires a grip state of the housing 101 (step S101). The acceleration sensor 130 may detect a change in acceleration when the housing 101 is gripped by a user and is lifted up. A detection result of the acceleration sensor 130 is provided to the state information acquisition unit 141 of the processor 140.

Next, the state information acquisition unit 141 determines whether the housing 101 has been gripped based on the detection result of the acceleration sensor 130 (step S103). When the change in acceleration detected by the acceleration sensor 130 exceeds a threshold value, the state information acquisition unit 141 determines that the housing 101 has been gripped. Here, when it is determined that the housing 101 has been gripped, the state information acquisition unit 141 may provide a determination result to the switching signal generation unit 145, and the procedure proceeds to step S105. Meanwhile, when it is not determined that the housing 101 has been gripped, the state information acquisition unit 141 waits for a next determination result from the acceleration sensor 130, and the procedure proceeds to step S101.

When it is determined that the housing 101 has been gripped in step S103, the switching signal generation unit 145 switches the mode of the touch sensor 113 from the sleep mode to the power saving mode (step S105). As described above, in the sleep mode, power consumption is small, but a user's contact may not actually be detected. In the power saving mode, the user's contact is minimally detected with relatively low power consumption. Consequently, it is possible for the touch sensor 113 to detect the user's contact through the switching of the detection mode.

Next, the operation information acquisition unit 143 may determine whether a user's contact to the touch panel 110 has been detected based on the detection result of the touch sensor 113 (step S107). When it is determined that the contact to the touch panel 110 has been detected, the operation information acquisition unit 143 provides a determination result to the switching signal generation unit 145, and the procedure proceeds to step S109. In addition, a process when it is not determined that the contact to the touch panel 110 has been detected will be described later.

When it is determined that the contact to the touch panel 110 has been detected in step S107, the switching signal generation unit 145 switches the mode of the touch sensor 113 from the power saving mode to the active mode (step S109). As described above, in the active mode, a user's contact may be sufficiently detected with relatively high power consumption. Consequently, it is possible for the touch sensor 113 to sufficiently detect various types of operations such as a drag or a flick due to the user's contact through the switching of the detection mode.

Next, the operation information acquisition unit 143 may determine whether the contact with the touch panel 110 has been released based on the detection result of the touch sensor 113 (step S111). When it is determined that the contact has been released, the operation information acquisition unit 143 further determines whether a time has elapsed after the contact was released (step S113). When it is determined that the time has elapsed, the operation information acquisition unit 143 provides the switching signal generation unit 145 with a determination result, and the switching signal generation unit 145 switches the mode of the touch sensor 113 from the active mode to the power saving mode (step S115).

Meanwhile, when it is not determined that the contact has been released in step S111 and it is not determined that the time has elapsed in step S113, the procedure returns to step S111. This may include a case where the user's contact operation for the touch panel 110 is continued and a case where it is highly probable that the user's temporarily stopped contact operation has resumed. In such a case, the touch sensor 113 is maintained in the active mode and continuously acquires the user's contact operation.

After the mode of the touch sensor 113 is switched from the active mode to the power saving mode in step S115, the procedure returns to step S107. If it is determined that the contact to the touch panel 110 has been detected in step S107, the touch sensor 113 returns to the active mode in step S109.

Meanwhile, when it is not determined that the contact to the touch panel 110 has been detected in step S107, the state information acquisition unit 141 further determines whether the housing 101 has been set down based on the detection result of the acceleration sensor 130 (step S117). For example, when the change in acceleration detected by the acceleration sensor 130 becomes less than the threshold value, the state information acquisition unit 141 determines that the housing 101 has been set down. When the housing 101 has been gripped by a user, since a certain level of acceleration change is detected due to shaking, it is possible to detect whether the housing 101 has been set down under the above condition.

When it is determined that the housing 101 has been set down in step S117, the switching signal generation unit 145 switches the mode of the touch sensor 113 from the power saving mode to the sleep mode (step S119). In this way, the remote controller 100 is placed on the table and the like and returns to a state, in which the power consumption of the touch sensor 113 is minimal, similarly to the start of this procedure. In addition, by considering the probability that the housing 101 is immediately gripped again, step S119 may also be performed after the standby of a time has passed from step S117. Meanwhile, when it is not determined that the housing 101 has been set down, the procedure returns to step S107, and it is determined again whether a contact to the touch panel 110 has been detected.

So far, the process flow of the remote controller 100 has been described. Through the process flow, when the housing 101 has not been gripped by a user, the touch sensor 113 enters the sleep mode with lowest power consumption, so that it is possible to minimize power consumption in the remote controller 100. Furthermore, when the housing 101 has been gripped, and a contact to the touch panel 110 has not been detected, the touch sensor 113 enters the power saving mode with relatively low power consumption, so that it is possible to detect a contact and suppress the power consumption in the remote controller 100.

Modification of Process Flow

FIG. 4 is a flowchart illustrating the process of a modification of the remote controller 100 which is the electronic device according to the first embodiment of the present disclosure. The present modification, for example, can be applied to a case where the communication unit 160 of the remote controller 100 communicates with an external apparatus using Bluetooth (a registered trademark) and the like while maintaining a radio connection to the external apparatus. Hereinafter, in the present modification, step S205 performed instead of step S105 of the flowchart illustrated in FIG. 3, and step S219 performed instead of step S119 will be described.

In step S205, the switching signal generation unit 145 switches the mode of the touch sensor 113 from the sleep mode to the power saving mode and activates the communication unit 160. Then, the activated communication unit 160 finds an external device (a communication partner) through scanning and establishes a radio connection to the external device. Consequently, in the remote controller 100, it is possible for the touch sensor 113 to detect a user's contact and transmit information on a detected contact to the external device.

In step S219, the switching signal generation unit 145 switches the mode of the touch sensor 113 from the power saving mode to the sleep mode and suspends the communication unit 160. The communication unit 160 releases the radio connection to the external device and stops an operation. In addition, by considering the probability that the housing 101 is immediately gripped again, step S219 may also be performed after the standby of a time has passed from step S117. In this case, after the mode of the touch sensor 113 is switched to the sleep mode and the standby of the time has further passed, the communication unit 160 may also be suspended. In general, a time for activating the communication unit 160 is longer than a time for switching the mode of the touch sensor 113 from the sleep mode to the power saving mode. Consequently, with such a configuration, if a delay time until the communication unit 160 is stopped after the housing 101 is set down is increased, it is possible to prevent the occurrence of a waiting time required for the activation of the communication unit 160 when the user has immediately gripped the housing 101 again.

So far, the modification of the process flow of the remote controller 100 has been described. In the present modification, when the housing 101 is not gripped by a user, it is possible to minimize the power consumption of the communication unit 160 in addition to the touch sensor 113, and further reduce the power consumption in the remote controller 100. When the remote controller 100 receives push-type information from an external device, it is preferable to maintain a radio connection with the external device even when there is no transmission from the remote controller 100, as with the process of FIG. 3.

So far, the first embodiment of the present disclosure has been described. In the first embodiment, in the state where the touch sensor 113 is in the sleep mode, the grip of the housing 101 by a user is detected using the acceleration sensor 130 with low power consumption as compared with the touch sensor 113, so that it is possible to significantly reduce power consumption in the state where the housing 101 is not gripped and a contact operation is not performed with respect to the touch panel 110. Furthermore, after the grip of the housing 101 is detected, the mode of the touch sensor 113 is switched to the power saving mode, so that it is possible to reduce power consumption in the state where it is highly probable that the housing 101 is gripped and a contact operation is performed with respect to the touch panel 110, and to shorten a startup time when a contact operation has started. In order to allow the touch sensor 113 in the sleep mode or the power saving mode to enter the active mode, since a user does not need to separately operate a button and a mode is switched during a normal operation in which the user grips the housing 101 and makes contact with the touch panel 110, it is possible to achieve a high operational feeling without allowing the user to recognize the mode switching.

2. Second Embodiment

Next, the second embodiment of the present disclosure will be described. In the second embodiment, a plurality of sub-modes are set in the power saving mode of the touch sensor 113, and are changed according to the passage of time in the state where the power saving mode has been set in the touch sensor 113. In addition, except for an apparatus configuration and a state where the power saving mode has been set in the touch sensor 113, since processes before the mode of the touch sensor 113 is switched to the power saving mode from other modes and after the mode of the touch sensor 113 is switched to the other modes from the power saving mode can be performed in the same manner as the first embodiment, detailed description thereof will be omitted.

FIG. 5 is a diagram for explaining sub-modes of the power saving mode set in the touch sensor 113 in the second embodiment of the present disclosure. FIG. 5 illustrates power saving modes 1 to 3, which are sub-modes of the power saving mode, in comparison with the active mode. Hereinafter, respective modes will be described.

As described above, the active mode indicates a mode in which the sampling rate of the touch sensor 113 is set to a normal value, and is set when a user's contact operation is performed with respect to the touch panel 110. The sampling rate of the active mode may be higher than those of the sub-modes of the power saving mode.

Sampling rates of the power saving modes 1 to 3 may be different from one another. That is, the power saving modes 1 to 3 have different levels of power consumption and detection accuracy, respectively. In other words, the power saving modes 1 to 3 correspond to an example of sub-modes having different levels of power consumption and detection conditions, respectively. The sampling rates of these modes are lower than the sampling rate of the active mode, or are higher than the sampling rate (which may be zero) of the sleep mode.

The power saving mode 1 may have the highest power consumption and the highest detection accuracy because it has the highest sampling rate. The power saving mode 2 has the second highest power consumption and the second highest detection accuracy because it has the second highest sampling rate. The power saving mode 3 has the lowest power consumption and the lowest detection accuracy because it has the lowest sampling rate.

In addition, in the illustrated example, the sampling rate of the power saving mode 1 corresponds to ½ of that of the active mode, the sampling rate of the power saving mode 2 corresponds to ½ of that of the power saving mode 1, and the sampling rate of the power saving mode 3 corresponds to ½ of that of the power saving mode 2. However, the sampling rates of the respective sub-modes may be arbitrarily set by considering the conditions and the like which will be described later, regardless of the above relation. Furthermore, two sub-modes, other than three sub-modes, may be set, or a large number of sub-modes exceeding three may also be set.

FIG. 6 is a diagram for explaining an example of a detection mode set in the touch sensor 113 in the second embodiment of the present disclosure. For example, when a phase has been performed in which a user grips the housing 101 of the remote controller 100 placed on a table and the like (P1), makes contact with the touch panel after a moment (P2), releases the contact (P3), makes contact with the touch panel again after a moment (P4), releases the contact (P5), and places the housing on the table after a brief interval (P6), the detection mode set in the touch sensor 113 is changed as follows.

First, before the housing 101 of the remote controller 100 is gripped in P1, the sleep mode has been set in the touch sensor 113. In this state, the touch sensor 113 does not actually detect a user's contact. If the housing 101 is gripped in P1, the switching signal generation unit 145 switches the mode of the touch sensor 113 from the sleep mode to the power saving mode, and sets the power saving mode 1 in the touch sensor 113. As described above, the power saving mode 1 has the highest power consumption and the highest detection accuracy because it has the highest sampling rate among the sub-modes of the power saving mode.

Next, after the housing 101 is gripped in P1, the mode of the touch sensor 113 is switched to the power saving mode, and the power saving mode 1 is set, if a time elapses, the switching signal generation unit 145 switches the mode of the touch sensor 113 from the power saving mode 1 to the power saving mode 2. As described above, the power saving mode 2 has low power consumption as compared with the power saving mode 1 and low detection accuracy as compared with the power saving mode 1 because it has a low sampling rate as compared with the power saving mode 1.

Next, after the power saving mode 2 is set in the touch sensor 113, if a time elapses, the switching signal generation unit 145 switches the mode of the touch sensor 113 from the power saving mode 2 to the power saving mode 3. As described above, the power saving mode 3 has the lowest power consumption and the lowest detection accuracy because it has the lowest sampling rate among the sub-modes of the power saving mode.

Here, if a contact to the touch panel 110 is detected by the touch sensor 113 in P2, the switching signal generation unit 145 switches the mode of the touch sensor 113 from the power saving mode 3 to the active mode. In addition, even when the contact to the touch panel 110 has been detected in the state where the power saving mode 1 or the power saving mode 2 has been set in the touch sensor 113, the switching signal generation unit 145 switches the mode of the touch sensor 113 at that time to the active mode. Even after the contact to the touch panel 110 has been released in P3, the switching signal generation unit 145 maintains the touch sensor 113 in the active mode for a time similarly to the first embodiment.

Next, after the contact to the touch panel 110 has been released in P3, if a time elapses, the switching signal generation unit 145 switches the mode of the touch sensor 113 from the active mode to the power saving mode. Similarly to the case where the mode of the touch sensor 113 has been switched to the power saving mode in P1, the switching signal generation unit 145 sets the power saving mode 1 in the touch sensor 113.

Then, similarly to the interval between P1 and P2, the switching signal generation unit 145 sequentially sets modes with low power consumption and low detection accuracy in the touch sensor 113 according to the passage of time. In other words, the switching signal generation unit 145 sets the power saving mode 2 in the touch sensor 113 after the power saving mode 1, and sets the power saving mode 3 in the touch sensor 113 after the power saving mode 2.

Here, if a contact to the touch panel 110 is detected by the touch sensor 113 in P4, the switching signal generation unit 145 switches the mode of the touch sensor 113 from the power saving mode 3 to the active mode, similarly to P2. Even after the contact to the touch panel 110 has been released in P5, the switching signal generation unit 145 maintains the touch sensor 113 in the active mode for a time.

Next, after the contact to the touch panel 110 has been released in P5, if a time elapses, the switching signal generation unit 145 switches the mode of the touch sensor 113 from the active mode to the power saving mode, and sets the power saving mode 1 in the touch sensor 113.

Here, if the housing 101 is set down in P6, the switching signal generation unit 145 switches the mode of the touch sensor 113 from the power saving mode 1 to the sleep mode, similarly to the first embodiment. As illustrated in the drawing, the switching signal generation unit 145 may immediately switch the mode of the touch sensor 113 from the mode at that time to the sleep mode, may also switch the mode of the touch sensor 113 to a mode with low power consumption and low detection accuracy, such as the power saving mode 2 or the power saving mode 3, or may further switch the mode of the touch sensor 113 to the sleep mode after a time elapses.

In the example as described above, when the switching signal generation unit 145 switches the mode of the touch sensor 113 from the sleep mode or the active mode to the power saving mode, the switching signal generation unit 145 first sets the power saving mode 1, and sequentially sets the power saving mode 2 and the power saving mode 3 in the touch sensor 113 according to the passage of time.

In the above example, at the time point P1 at which the housing 101 is gripped and thus the mode of the touch sensor 113 is switched from the sleep mode to the power saving mode, it is highly probable that contact operation for the touch panel 110 starts immediately after that. Thus, by setting the power saving mode 1 with the highest detection accuracy among the sub-modes of the power saving mode, it is possible to react to the start of the contact operation in a relatively short time.

Meanwhile, after P1, when the contact operation does not start, it is estimated that a user has no intention to immediately start the contact operation. Thus, by sequentially setting the power saving mode 2 and the power saving mode with low power consumption, power consumption is suppressed. Meanwhile, when the user has started the contact operation, reaction is delayed as compared with the case where the power saving mode 1 has been set. The sampling rates of the power saving mode 2 and the power saving mode 3, for example, may be determined in consideration of the degree by which the delay is allowed.

Furthermore, at the time point at which the contact to the touch panel 110 has been released in P3, a time has elapsed, and the mode of the touch sensor 113 has been switched from the active mode to the power saving mode, it is highly probable that the user will resume the contact operation. Thus, by setting the power saving mode 1, it is possible to react to the resumption of the contact operation in a relatively short time.

Meanwhile, when the contact operation has not been resumed after that, it is estimated that the user has no intention to immediately resume the contact operation. Thus, similarly to the interval between P1 and P2, by sequentially setting the power saving mode 2 and the power saving mode 3 with low power consumption, power consumption is suppressed.

So far, the second embodiment of the present disclosure has been described. In the second embodiment, the plurality of sub-modes are set in the power saving mode and may be changed according to the passage of time in the state where the power saving mode has been set in the touch sensor 113, resulting in the reduction of power consumption.

3. Third Embodiment

Next, the third embodiment of the present disclosure will be described. In the third embodiment, instead of the acceleration sensor 130, an electric field sensor 230 may be used as a sensor for acquiring the grip state of the housing 101. In addition, except for that, since an apparatus configuration and a process flow may be equal to those of the first or second embodiment, detailed description thereof will be omitted.

FIG. 7 is a diagram illustrating a remote controller 200 which is an electronic device according to the third embodiment of the present disclosure. The remote controller 200 according to the present embodiment has approximately the same configuration as that of the remote controller 100 according to the first embodiment, except that electric field sensors 230a and 230b are used.

The electric field sensors 230a and 230b are a pair of electric field sensors provided at an inner side of the housing 101. In the electric field sensors 230a and 230b, one serves as a transmission electrode, the other one serves as a reception electrode, and an electric field is generated there between. For example, if a user's hands approach the housing 101 in order to grip the housing 101, the electric field is changed. The electric field sensors 230a and 230b detect whether the user's hands and the like have approached the housing 101 according to a change in the electric field. In addition, the electric field sensor 230 is also a sensor having lower power consumption than the touch sensor 113.

The state information acquisition unit 141 of the processor 140 acquires an approach state of a user to the housing 101 from a detection result of the electric field sensor 230. In the present embodiment, the state information acquisition unit 141 may acquire the approach state of the user to the housing 101, and uses the approach state when the switching signal generation unit 145 switches the detection mode of the touch sensor 113, similarly to the grip state of the housing 101 in the above-mentioned embodiments.

So far, the third embodiment of the present disclosure has been described. In the third embodiment, since the electric field sensor 230 may be used as a sensor for acquiring the state of the housing 101, even when it is assumed that a user operates the housing 101 in the state where the housing 101 has been placed on a table, it is possible to reduce power consumption by switching the detection mode of the touch sensor 113.

4. Fourth Embodiment

Next, the fourth embodiment of the present disclosure will be described. In the fourth embodiment, modes in which the number of detection points of a contact is different may be set as the detection mode of the touch sensor 113. In addition, since an apparatus configuration and a process flow may be the same as those of the first to third embodiments, detailed description thereof will be omitted.

FIGS. 8(a), 8(b) and 8(c) illustrate diagrams for explaining a detection mode set in the touch sensor 113 according to the fourth embodiment of the present disclosure. FIGS. 8(a), 8(b) and 8(c) schematically illustrate a touch sensor including an electrode group 115a in the longitudinal direction and an electrode group 115b in the transversal direction. However, this is not for specifying the type of the touch sensor 113. In other words, even when the touch sensor 113 has a certain type, the number of detection points is changed using a method corresponding to the type of the touch sensor 113, resulting in the application of the present embodiment.

Hereinafter, a sleep mode, a power saving mode, and an active mode, which are first to third detection modes of the touch sensor 113 in the present embodiment, will be described.

The first detection mode is a sleep mode illustrated in (a) and a number of detection points of the touch sensor 113 is set to a minimum value. In the illustrated example, all the electrode groups 115a and 115b are set to OFF and the number of detection points is zero. In this mode, the power consumption of the touch sensor 113 is the lowest among the above three modes. In addition, the power consumption of the acceleration sensor 130 is lower than the power consumption of the touch sensor 113 driven in the sleep mode. Meanwhile, the detection accuracy of the touch sensor 113 is low and a user's contact is not actually detected. The sleep mode may also be an OFF mode in which no power is supplied to the touch sensor, or a standby mode in which power is slightly supplied for quick transition to other modes, and the like.

The second detection mode may be a power saving mode illustrated in (b) and the number of detection points of the touch sensor 113 is set to a value smaller than a normal value. For example, electrodes of each of the electrode groups 115a and 115b are set such that ON and OFF are repeated at a rate. In the illustrated example, the electrodes of each of the electrode groups 115a and 115b are turned ON every one electrode. However, for example, the electrodes may also be turned ON at other rates such as every two electrodes or every three electrodes. In this mode, the power consumption of the touch sensor 113 is relatively low. Meanwhile, a case in which the detection accuracy of the touch sensor 113 is relatively low and a user's contact itself is detected, but the contact is not correctly detected according to the type of contact operation may occur. The detection accuracy of a detection condition of the power saving mode is higher than that of a detection condition of the sleep mode. This is an example in which, in the second detection mode, the second detection unit is driven in the second detection condition with a weak restriction as compared with the first detection condition of the first detection mode.

The third detection mode is an active mode illustrated in (c) and the number of detection points of the touch sensor 113 is set to the normal value. In the illustrated example, all the electrode groups 115a and 115b are set to ON. In this mode, since the power consumption of the touch sensor 113 is relatively high, long time continuity of this mode reduces the battery lifespan. Meanwhile, since the detection accuracy of the touch sensor 113 is high, it is possible to correctly detect various types of contact operations. The detection accuracy of the detection condition of the active mode is higher than that of the detection condition of the power saving mode. This is an example in which, in the third detection mode, the second detection unit is driven in the third detection condition with a weak restriction as compared with the second detection condition of the second detection mode. As described above, in the present embodiment, the "detection condition with a weaker restriction" may correspond to a "detection condition with higher accuracy".

Here, the value of the number of detection points for determining the detection accuracy in the power saving mode, which is the second detection mode, may also be changed according to the type of an application executed in an external device which receives information on a contact to the touch panel 110 from the remote controller 100. The application may use the contact information as an operation input.

For example, when an application using an operation such as a tap operation or a pointing operation with relatively short contact trace on the touch panel 110 is executed in an external device, the switching signal generation unit 145 may set a relatively large number of detection points, at which such an operation is detectable, as the number of detection points of the power saving mode. Furthermore, for example, when an application using an operation such as a flick operation or a drag operation with a relatively long contact trace on the touch panel 110 is executed in the external device, the switching signal generation unit 145 may set a relatively small number of detection points as the number of detection points of the power saving mode.

In addition, information on the application executed in the external device, for example, can be acquired by allowing the communication unit 160 to perform bi-directional communication including transmission to the external device and reception from the external device, and receiving information on an application, which is transmitted from the external device, using the communication unit 160.

Furthermore, similarly to the second embodiment, the power saving mode may have a plurality of sub-modes with a different number of detection points, and the sub-mode may also be sequentially switched to a mode with a small number of detection points according to the passage of time.

Modification of Arrangement of Detection Points

FIG. 9 illustrates a modification related to an arrangement of detection points of the touch sensor 113 according to a fourth embodiment of the present disclosure. The present modification, for example, may be applied to a case where icons 117 for a contact operation are arranged only at a part of a screen of the display 111.

In the present modification, the touch sensor 113 is divided into two areas 113a and 113b, and detection points are arranged only in the area 113b in the power saving mode. The detection points of the area 113b may be arranged with the same density as that of the active mode as illustrated in the drawing, or may also be arranged with a density lower than that of the active mode.

Here, the area 113b where the detection points are arranged corresponds to positions at which the icons 117 are displayed on the display 111. The icons 117 are for the contact operation, and at least one icon 117 is displayed on the display 111.

In addition, division areas of the touch sensor 113 in the present modification are not limited to the areas 113a and 113b. For example, the touch sensor 113 may be divided into finer areas, and detection points may also be arranged only in the vicinity of the icons 117.

In the present modification, when the touch sensor 113 is driven in the power saving mode, the detection points are arranged in a wider range as compared with the sleep mode. Furthermore, when the touch sensor 113 is driven in the active mode, the detection points are arranged in a wider range as compared with the power saving mode. As described above, in the present modification, the "detection condition with a weaker restriction" may correspond to a "wider detection range."

So far, the fourth embodiment of the present disclosure has been described. In the fourth embodiment, a mode with a reduced number of detection points of a contact operation is set as the power saving mode of the touch sensor 113, so that it is possible to reduce power consumption while waiting for a user's contact operation, differently from the above-mentioned embodiments. If a mode with a sampling rate increased by reducing the number of detection points of a contact operation is set as the power saving mode of the touch sensor 113 with the combination of the fourth embodiment and the above-described embodiments, it is possible to further reduce power consumption.

5. Other Types of Modification

Various types of modifications for the above-mentioned embodiments will be described below.

For Type of Electronic Device

In the above-mentioned embodiments, the remote controller has been described as an example of the electronic device. However, the electronic device according to the embodiment of the present disclosure is not limited to the remote controller. For example, the electronic device may include all suitable types of electronic devices that perform operation input in the state where a user has gripped or approached the electronic devices, such as tablet PCs (Personal Computers), smart phones, cellular phones, or portable game machines. The electronic device may also include other devices that incorporate one or more of the features described herein.

In addition, even when the electronic device is driven by a rechargeable battery instead of a dry cell, for example, the suppression of power consumption according to the embodiment of the present disclosure is available for extending a charging interval. Furthermore, even when the electronic device is driven by a fixed power source, the suppression of power consumption is available in terms of energy saving.

Here, when the electronic device is a device which executes an application by itself such as a tablet PC or a smart phone, the value of the sampling rate or the number of detection points in a power saving mode may be changed according to the type of the application executed by the electronic device. The application may include an application which uses contact information as an operation input.

For Power Saving Mode

According to the above-mentioned embodiments, in the power saving mode, the power consumption of the touch sensor is suppressed by changing the sampling rate or the number of detection points. However, the power consumption of the touch sensor may also be suppressed using other methods. For example, in the power saving mode, the touch sensor detects the presence or absence of a contact. However, the touch sensor may also be set not to perform an arithmetic process for calculating the position of the contact. In this case, power consumption corresponding to the arithmetic process is reduced. Such a power saving mode may be called a mode with high detection accuracy as compared with the sleep mode, and low detection accuracy as compared with the active mode.

For Grip of Housing

When a sensor for detecting the grip state of the housing is an acceleration sensor, it is possible to detect the posture of the housing from an acceleration value, in addition to whether the housing has been gripped. Using this, a switching condition from the sleep mode to the power saving mode may be set as a condition that the housing is gripped with a range of posture. The range of posture, for example, may include a range of the posture of the housing in which the touch panel provided in the housing is changed in the upward direction to the transversal direction. In this way, for example, when a user watches content displayed on an external device without performing operation input while gripping the remote controller, it is possible to reduce power consumption by allowing the touch sensor to be in the sleep mode.

For Use of Clickable Touch Panel

The electronic device according to the embodiment of the present disclosure may also have a clickable touch panel. In this case, a click of the touch panel may also be used as a switching trigger of a detection mode of the touch sensor. For example, when the power saving mode has been set in the touch sensor and a user starts a contact operation through a pointing operation causing a click of the touch panel, if the mode of the touch sensor is switched from the power saving mode to the active mode through the click of the touch panel, it is possible to further increase the sampling rate of the power saving mode and to further reduce power consumption.

6. Supplement

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

1) A device comprising:
a memory storing instructions; and
a processing circuit executing the instructions to:
detect a first user action;
establish a first user action state based on the detected first user action;
designate a first mode based on the first user action state;
determine if a second user action, consistent with a first detection condition associated with the first mode, has taken place;
when the second user action has taken place, establish a second user action state based on the second user action; and
designate a second mode based on the second user action state, the second mode consuming more power than the first mode.

(2) The device of (1), the first mode and the second mode are power saving modes.

(3) The device of (1) or (2), further comprising a first sensor configured to detect the first user action and a second sensor configured to detect the second user action, wherein the first sensor and the second sensor are different.

(4) The device of (2), wherein the second mode saves power consumed by the second sensor.

(5) The device of any one of (1) to (4), further comprising instructions to:
when the second user action has not taken place, designate a third power saving mode, the third power saving mode consuming less power than the first mode.

(6) The device of any one of (1) to (5), wherein the first detection condition comprises the occurrence of the second user action within a specified time period following designation of the first mode.

(7) The device of any one of (1) to (7), wherein the second user action state is an active state.

(8) The device of any one of (1) to (7), wherein the processing circuit executes the instructions to:
when the second mode is designated:
determine if a third user action, consistent with a second detection condition associated with the second mode, has taken place;
when the third user action condition has taken place, establish a third user action state based on the third user action; and
when the third user action has not taken place, designate a third mode, the third mode consuming less power than the second mode.

(9) The device of (8), wherein the second detection condition comprises the occurrence of the third user action within a specified time period following designating the second mode.

(10) The device of (8) or (9), wherein:
the first detection condition comprises a first detection frequency;
the second detection condition comprises a second detection frequency; and
the first detection frequency is greater than the second detection frequency.

(11) The device according to (6), wherein the processing circuit executes the instructions to:
transmit, to an external device, information indicative of at least one of the first detection condition or the second detection condition;
receive information, from the external device, indicative of a type of application running on the external device; and
set, based on the received information, the at least one of the first detection condition or the second detection condition.

(12) The device according to (6) or (11), wherein the processing circuit executes the instructions to establish at least one of the first detection condition or the second detection condition, based on a type of application executed in the device and at least one of the first user action or the second user action.

(13) The device according to any one of (1) to (12), wherein:
the second mode comprises:
a first sub-mode having a first sub-mode level of power consumption and a first sub-mode detection condition;
a second sub-mode having a second sub-mode level of power consumption and a second sub-mode detection condition, the second sub-mode level of power consumption being less than the first sub-mode level of power consumption; and
the processing circuit executes the instructions to, when the second mode is designated:
determine if a third user action, consistent with a second detection condition associated with the second mode, has taken place;
when the third user action has not taken place:
designate the first sub-mode;
determine if a fourth user action, consistent with a third detection condition associated with the second mode, has taken place; and
when the fourth user action has not taken place, designate the second sub-mode.

(14) The device according to (13), wherein:
the second detection condition comprises an occurrence of the third user action within a first specified time period following designating the second mode; and
the third detection condition comprises an occurrence of the fourth user action within a second specified time period following designating the first sub-mode.

(15) The device according to any one of (1) to (14):
further comprising a communication unit configured to transmit, to an external device, information relating to the first operation;

wherein the processing circuit executes the instructions to activate the communication unit when the first user action is detected.

(16) The device according to (15), wherein the processing circuit executes the instructions to suspend the communication unit when the first user action is not detected.

(17) The device according to any one of (8) to (10), wherein:
the first user action is a grip of a housing of the device;
the second user action is a contact with a portion of the device other than the housing; and
the third user action is a contact with the portion of the device other than the housing.

(18) The device according to (17), wherein:
the first detection condition comprises an occurrence of the second user action within a first specified time period following designating the first mode; and
the second detection condition comprises an occurrence of the third user action within a second specified time period following designating the second mode, the second time period being shorter than the first time period.

(19) The device according to (17) or (18), wherein:
the first detection condition comprises detecting the second user action via a first number of detection points arranged on the portion of the device other than the housing;
the second detection condition comprises detecting the third user action via a second number of the detection points arranged on the portion of the device other than the housing, the second number of detection points being larger than the first number of detection points.

(20) The device according to any one of (1) to (19), wherein detecting the first user action further comprises detecting a user grip of a housing within a posture range.

(21) The device according to any one of (1) to (20), further comprising:
a first user action sensor configured to detect the first user action;
a touch sensor associated with a touch panel and configured to detect the second user action; and
a communication unit configured to transmit, to an external device, information associated with at least one of the first user action or the second user action.

(22) The device according to any one of (1) to (21), wherein the first user action sensor comprises at least one of an acceleration sensor or an electric field sensor.

Additionally, the present technology may also be configured as below.

REFERENCE SIGNS LIST 100, 200 remote controller
101 housing
110 touch panel
111 display
113 touch sensor
130 acceleration sensor
140 processor
141 state information acquisition unit
143 operation information acquisition unit
145 switching signal generation unit
150 memory
160 communication unit
230 electric field sensor

The invention claimed is:
1. A device, comprising:
processing circuitry configured to:
detect a first user action according to a first signal received from a first sensor while operating in a first mode, the first user action being gripping and lifting up of the device;
change an operation mode from the first mode to a second mode based on the first user action;
detect a second user action according to a second signal received from a second sensor while operating the second mode, the second sensor being a capacitance-type touch sensor, the second user action being a touch operation of a display of the device and the second user action being consistent with a first detection condition associated with the second mode;
perform an operation based on the second user action; and
change the operation mode from the second mode to a third mode after a predetermined period of time elapses without detection of the second user action, wherein
the second mode consumes more power than the first mode, and
the third mode is a power saving mode configured to save power consumed by the second sensor, the third mode consuming more power than the first mode.

2. The device according to claim 1, wherein the second mode is an active mode.

3. The device according to claim 1, wherein the processing circuitry is configured to change the operation mode from the second mode to the first mode after a predetermined period of time elapses without detection of the second user action.

4. The device according to claim 1, wherein the first sensor and the second sensor are different sensors.

5. The device according to claim 1, wherein the first sensor is an acceleration sensor.

6. The device according to claim 5, wherein the acceleration sensor is a piezoelectric-type sensor or a piezo resistance-type sensor.

7. The device according to claim 1, further comprising the first sensor and the second sensor.

8. The device according to claim 1, wherein the second mode consumes more power than the third mode.

9. A non-transitory computer readable medium storing computer executable instructions which, when executed by processing circuitry of a device, cause the device to:
receive a first signal from a first sensor to detect a first user action while operating in a first mode, the first user action being gripping and lifting up of the device;
change an operation mode from the first mode to a second mode based on the first user action;
determine, when a second signal is received from a second sensor and the operation mode is the second mode, that a second user action is performed, the second sensor being a capacitance-type sensor, the second user action being a touch operation of a display of the device and the second user action being consistent with a first detection condition associated with the second mode;
perform an operation based on the second user action; and
change the operation mode from the second mode to a third mode after a predetermined period of time elapses without detection of the second user action, wherein
the second mode consumes more power than the first mode, and
the third mode is a power saving mode configured to save power consumed by the second sensor, the third mode consuming more power than the first mode.

10. The non-transitory computer readable medium according to claim 9, wherein the device is further caused to change the operation mode from the second mode to the first mode after a predetermined period of time elapses without detection of second user action.

11. The non-transitory computer readable medium according to claim 9, wherein the first sensor is an acceleration sensor.

12. A method, comprising:
receiving a first signal from a first sensor, of a device, to detect a first user action while operating in a first mode, the first user action being gripping and lifting up of the device;
changing, by processing circuitry of the device, an operation mode from the first mode to a second mode based on the first user action state;
determining, when a second signal is received from a second sensor and the operation mode is the second mode, that a second user action is performed, the second sensor being a capacitance-type sensor, the second user action being a touch operation of a display of the device and the second user action being consistent with a first detection condition associated with the second mode;
performing, by the processing circuitry, an operation based on the second user action; and
changing the operation mode from the second mode to a third mode after a predetermined period of time elapses without detection of the second user action, wherein
the second mode consumes more power than the first mode, and
the third mode is a power saving mode configured to save power consumed by the second sensor, the third mode consuming more power than the first mode.

13. The method according to claim 12, wherein the first sensor is an acceleration sensor.

14. The method according to claim 13, wherein the acceleration sensor is a piezoelectric-type sensor or a piezo resistance-type sensor.

15. The method according to claim 12, further comprising changing the operation mode from the second mode to the first mode after a predetermined period of time elapses without detection of the second user action.

16. The method according to claim 12, wherein the second mode is an active mode.

17. The method according to claim 12, wherein the first sensor and the second sensor are different sensors.

* * * * *